US012755636B2

(12) United States Patent
Murphy et al.

(10) Patent No.: US 12,755,636 B2
(45) Date of Patent: Oct. 6, 2026

(54) ENHANCED PROCESSING TO DISCRIMINATE BETWEEN ADS B TRAFFIC/TRACKS WITH DUPLICATE AIRCRAFT ADDRESSES

(71) Applicant: BAE SYSTEMS Information and Electronic Systems Integration Inc., Nashua, NH (US)

(72) Inventors: Michael S. Murphy, Centerport, NY (US); Domenico Russo, Blue Point, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 458 days.

(21) Appl. No.: 18/206,905

(22) Filed: Jun. 7, 2023

(65) Prior Publication Data

US 2024/0412644 A1 Dec. 12, 2024

(51) Int. Cl.

| | |
|---|---|
| ***G08G 5/22*** | (2025.01) |
| ***G08G 5/26*** | (2025.01) |
| *H04B 7/185* | (2006.01) |

(52) U.S. Cl.

CPC ................. *G08G 5/22* (2025.01); *G08G 5/26* (2025.01); *H04B 7/18502* (2013.01)

(58) Field of Classification Search

None

See application file for complete search history.

(56) References Cited

U.S. PATENT DOCUMENTS 6,542,810 B2 4/2003 Lai
6,594,578 B2 7/2003 Lai
(Continued)

FOREIGN PATENT DOCUMENTS

WO 03060854 A1 7/2003

OTHER PUBLICATIONS

U.S. Department of Transportation, Federal Aviation Administration, Surveillance and Broadcast Services Program; "Automatic Dependent Surveillance-Broadcast (ADS-B) / ADS-B Rebroadcast (ADS-R) Critical Services Specification", FAA-E-3011, Revision A, pp. 35-36. (Year: 2015).*

*Primary Examiner* — Vladimir Magloire
*Assistant Examiner* — Ashley Brown Raynal
(74) *Attorney, Agent, or Firm* — Maine Cernota & Curran; Gary McFaline

(57) ABSTRACT

A method of enhanced processing used to discriminate between ADS-B messages with a duplicate announced address comprising: receiving ADS-B messages that comprise information for display by a display of traffic information from at least two targets on a receiver; identifying the ADS-B messages having the duplicate announced address with one of the at least two targets using at least one discriminator by assigning a weighting factor to the at least one discriminator and, where the integration of the at least one discriminator and weighting factor exceeds a predetermined threshold value, considering the ADS-B messages that were subject to the at least one discriminator as being discriminated messages associated with one of the at least two targets; and displaying information provided by the discriminated messages on a display of traffic information as if the discriminated messages had been initially associated with only one of the at least two targets.

20 Claims, 7 Drawing Sheets

(56) References Cited

U.S. PATENT DOCUMENTS

| | | | |
|---|---|---|---|
| 6,799,114 B2 | 9/2004 | Etnyre | |
| 6,810,322 B2 | 10/2004 | Lai | |
| 7,043,355 B2 | 5/2006 | Lai | |
| 8,478,513 B1 | 7/2013 | Kar | |
| 8,681,040 B1 | 3/2014 | Rathinam | |
| 8,736,465 B2 | 5/2014 | Rutherford | |
| 9,069,077 B2 | 6/2015 | Hartley | |
| 9,182,484 B2 | 11/2015 | Schulte | |
| 9,530,323 B1 | 12/2016 | Maji | |
| 9,666,080 B2 | 5/2017 | Shanbhag | |
| 11,068,593 B2 | 7/2021 | Shabtai | |
| 11,531,099 B2 | 12/2022 | Bartone | |
| 2005/0007272 A1 | 1/2005 | Smith | |
| 2012/0041620 A1* | 2/2012 | Stayton | G08G 5/25 701/3 |
| 2019/0042748 A1 | 2/2019 | Shabtai | |
| 2022/0094710 A1* | 3/2022 | Riahi Manesh | G06F 21/554 |

* cited by examiner

| BDS Reg | 1090 ES ADS-B Message | Message Types (Subtypes) | Broadcast Rate | | |
|---|---|---|---|---|---|
| | | | Ground not moving | Ground moving | Airborne |
| 0,5 | Airborne Position | 0, 9-18, 20-22 | - | - | 0.4s-0.6s |
| 0,6 | Surface Position | 5-8 | 4.8s-5.2s | 0.4s-0.6s | - |
| 0,8 | Aircraft Identification and Cat | 1-4 | 9.8s-10.2s | 4.8s-5.2s | 4.8s-5.2s |
| 0,9 | Airborne Velocity | 19 (1-2, 3-4) | - | - | 0.4s-0.6s |
| 6,2 | Target State and Status | 29 (0,1) | - | - | 1.2s-1.3s |
| 6,5 | Aircraft Operational Status | 31 (0,1) | 4.8s-5.2s | 2.4s-2.6s (no change)<br>0.7s-0.9s (SIL/NIC change) | 2.4s-2.6s (no change)<br>0.7s-0.9s (SIL/NIC change) |

ENHANCED PROCESSING TO DISCRIMINATE BETWEEN ADS B TRAFFIC/TRACKS WITH DUPLICATE AIRCRAFT ADDRESSES

RELATED APPLICATIONS

This application is related to co-pending U.S. application Ser. No. 18/330,880 entitled APPARATUS AND METHOD FOR AUTHENTICATING ADS-B TRACKS, also by the present Applicant, which is herein incorporated by reference in its entirety for all purposes.

FIELD OF THE DISCLOSURE

The following disclosure relates generally to air traffic control, and, more specifically, to discrimination between Automatic Dependent Surveillance-Broadcast (ADS-B) traffic/tracks with duplicate aircraft addresses.

BACKGROUND

With an ever-increasing number of aircraft using the National Airspace System (NAS), which includes airspace, navigation facilities, and airports of the United States along with their associated information, services, rules, regulations, policies, procedures, personnel and equipment as well as components shared jointly with the military, there is a need for increasing the capacity of the system to handle the growing traffic. One way to increase the capacity of the NAS is to increase the flexibility of individual operators to utilize paths and airspeeds of their own choosing, as opposed to those mandated by an air traffic controller or similar authority. Any changes must, however, result in Airborne Separation Assurance (ASA), the ability of the flight crew to maintain separation of their aircraft from one or more aircraft in the vicinity, being maintained or improved on, to maintain current safety standards.

To support the need for increased flexibility and capacity in the future National Airspace System, approaches that distribute air traffic separation and management tasks to both airborne and ground-based systems have been proposed and partially implemented. One example of such a technology is Automatic Dependent Surveillance-Broadcast (ADS-B).

ADS-B is a surveillance technology in which an aircraft determines its position via satellite navigation and/or other sensors and periodically broadcasts this information along with a unique identifier, an aircraft Announced Address (AA), enabling the aircraft to be tracked. The AA is a 24-bit field that is typically assigned to a particular airframe by the International Civil Aviation Organization (ICAO), although Department of Defense (DoD) and government aircraft are allowed to change their AA in the interest of increasing operational security.

The current, 24-bit AA field has a resolution capable of uniquely identifying over 16 million operational aircraft. Since the estimated global commercial fleet of aircraft is approximately 26 thousand, in operation it is assumed that the AA field uniquely identifies all aircraft currently operating worldwide with growth for the indefinite future.

The information associated with the AA can be received by air traffic control ground stations as a replacement for, or supplement to, secondary surveillance radar, as no interrogation signal is needed from the ground. It can also be received by other aircraft to provide situational awareness and allow self-separation. ADS-B is "automatic" in that it requires no pilot or external input. It is "dependent" in that it depends on data from the aircraft's navigation system.

Real-time ADS-B is now the preferred method of surveillance for air traffic control in the NAS and has improved safety and efficiency in the air and on runways, reduced costs, and lessened harmful effects on the environment.

For Airborne Separation Assurance (ASA) applications (such as RTCA DO-317 applications) using ADS-B, however, a problem occurs in assigning separate tracks to traffic received with identical (duplicate) AA codes. When two targets broadcast the same AA, data parameters from their respective squitters will be comingled during the report generation process of ADS-B receivers and consequently the resultant reports and tracks will be corrupted for the aircrafts with duplicate addresses.

The duplicate address problem occurs for a number of reasons, including military aircraft often changing their AA, which is most often hand-keyed into a transponder, introducing the potential for human error into the ADS-B technology. It has been noted in European airspace that U.S. military aircraft are routinely flying with duplicate AA codes. Also, "non-strapped" aircraft, i.e. those that do not have an ADS-B transponder permanently mounted to the airframe with a hard-wired AA value, may cause a duplicate AA when transponders are swapped out without reprogramming and/or re-setting the AA. Finally, a duplicate AA may be the result of a malicious attack, such as where an attacker intends on corrupting air traffic control.

Whatever the cause of the duplicate AA, what is needed are systems and methods of distinguishing between duplicate AA traffic, allowing such traffic to be independently tracked, thus minimizing disruptions and maintaining required ASA.

SUMMARY

One objective of the present disclosure is to improve situational awareness for pilots using ADS-B based airborne separation applications, such as described in RTCA DO-317, by providing a more robust and clearer picture of surrounding air traffic. More specifically, the disclosure provides enhanced processing of duplicate AA traffic that resolves this type of ambiguous air traffic, such that the duplicate traffic can be individually tracked, improving on the current approach of downgrading uncertainty factors.

An exemplary embodiment of the present disclosure provides a software-implemented approach that is easily integrated into existing ASA systems.

In embodiments, temporal processing (e.g. pattern discrimination) of ADS-B squitters by a receiving aircraft is used to discriminate between duplicate AA traffic.

In embodiments, antenna diversity and/or relative power levels are used to discriminate between duplicate AA traffic.

In embodiments, parameter heuristics for slow varying parameters is used to discriminate between duplicate AA traffic.

In embodiments, parameter heuristics, antenna diversity, relative power levels, temporal processing, and/or additional discriminators are used, in embodiments in a weighted manner, to discriminate between duplicate AA traffic.

One embodiment of the present disclosure provides a method of enhanced processing used to discriminate between ADS-B traffic/tracks with duplicate aircraft announced addresses, the method comprising: receiving ADS-B messages on a receiver, wherein messages from at least two targets share an announced address; attempting to associate messages having the same announced address with one of the at least two targets using at least a first method of discrimination; assigning a score to a result of the at least first method of discrimination; and where the score exceeds a predetermined threshold value, considering the ADS-B messages that were subject to the at least first method of discrimination as being discriminated messages associated with a single target; and displaying the data provided by the discriminated messages on a cockpit display of traffic information module as if they had been initially associated with only one of the at least two targets.

Another embodiment of the present disclosure provides such a method, wherein the first method of discrimination comprises comparing received power levels between duplicate announced address traffic and correlating relative received power levels to target ranges.

A further embodiment of the present disclosure provides such a method, wherein received power levels are obtained from a front end of the receiver.

Yet another embodiment of the present disclosure provides such a method, wherein the first method of discrimination is diversity discrimination.

A yet further embodiment of the present disclosure provides such a method, wherein the receiver is in operative communication with at least two antennas, each of which is spaced apart from the other, and wherein diversity discrimination comprises the comparison of signal strength on each receiver to information contained in the ADS-B message(s) to determine the likelihood that a target is the source of the message.

Still another embodiment of the present disclosure provides such a method, wherein the first method of discrimination is sequence analysis.

A still further embodiment of the present disclosure provides such a method, wherein sequence analysis comprises pairing messages such that they comply with an expected periodicity, with squitters that do not fit a compliant message period or pattern being assumed to belong to a separate, but concurrent, source.

Even another embodiment of the present disclosure provides such a method, wherein the first method of discrimination is parameter heuristics for slow varying parameters.

An even further embodiment of the present disclosure provides such a method, wherein parameter heuristics for slow varying parameters comprises treating any change to slow varying data received for an announced address currently being tracked as increasing a likelihood that an announced address is a duplicate announced address.

A still even another embodiment of the present disclosure provides such a method, wherein the first method of discrimination comprises the comparison of established track fields to the later-received messages having a duplicate AA.

A still even further embodiment of the present disclosure provides such a method, wherein the first method of discrimination is Doppler offset.

Still yet another embodiment of the present disclosure provides such a method, wherein the Doppler offset is estimated from baseband waveform samples over a duration of a pulse train.

A still yet further embodiment of the present disclosure provides such a method, wherein if it is known that a target is moving away from or towards a reference location, its Doppler offset is noted and used for discrimination, with significant changes to Doppler offset being indicative of duplicate announced address traffic, unless an analogous change to relative velocity is also simultaneously observed.

Even yet another embodiment of the present disclosure provides such a method, wherein Doppler offset is used to detect spoofing by associating a target generating a track that is advertising position and velocity changes relative to a reference location, without expected Doppler changes, with spoofing.

An even yet further embodiment of the present disclosure provides such a method, wherein the cockpit display of traffic information is configured to display full symbology for the targets sharing the same announced address if or to display limited symbology corresponding to those parameters of the targets sharing the same announced address that could be differentiated.

Still even yet another embodiment of the present disclosure provides such a method, wherein attempting to associate the messages having the same announced address with a single target comprises the use of artificial intelligence, a rules based expert system, frequency profiling, Fourier analysis, fingerprinting, or pattern matching.

One embodiment of the present disclosure provides a method of enhanced processing to discriminate between ADS-B traffic/tracks with duplicate aircraft addresses, the method comprising: receiving ADS-B messages on a receiver, wherein messages from at least two targets share the same announced address; attempting to associate messages having the same announced address with one of the at least two targets using at least a first method of discrimination, a second method of discrimination, and an $N^{th}$ method of discrimination, where Nis an integer; generating a scoring system for each method of discrimination; applying a weighting factor to each method of discrimination; summing the weighted scores; and when the summed, weighted scores exceed a threshold value, associating the messages with a particular target and displaying data conveyed by the ADS-B messages now associated with the particular target on a cockpit display of traffic information.

Another embodiment of the present disclosure provides such a method further comprising, when the summed, weighted scores fail to exceed the threshold value, associating at least one message associated with a low tolerance data field with a particular target and displaying conveyed by the ADS-B messages now associated with the particular target on a cockpit display of traffic information.

A further embodiment of the present disclosure provides such a method, wherein attempting to associate messages having the same announced address with one of the at least two targets is performed on a message-by-message basis.

One embodiment of the present disclosure provides a computer program product including one or more machine-readable mediums encoded with instructions that when executed by one or more processors cause a process to be carried out for enhanced processing to discriminate between ADS-B traffic/tracks with duplicate aircraft announced addresses, the process comprising: receiving ADS-B messages on a receiver, wherein messages from at least two targets share an announced address; attempting to associate messages having the same announced address with one of the at least two targets using at least a first method of discrimination; assigning a score to a result of the at least first method of discrimination; and where the score exceeds a predetermined threshold value, considering the ADS-B messages that were subject to the at least first method of discrimination as being discriminated messages associated with a single target; and displaying the data provided by the discriminated messages on a cockpit display of traffic information module as if they had been initially associated with only one of the at least two targets.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

As a preliminary matter, the term squitter(s) and/or extended squitter(s) used herein should be understood to refer to non-solicited ADS-B/TIS-B messages produced by aircraft radio systems as defined in RTCA DO-260 (MOPS for 1090 MHz Extended Squitter ADS-B and TIS-B).

Figure 1:
Figure 1 (Prior Art)
FIG. 1 is an illustration showing a prior art Cockpit Display of Traffic Information (CDTI) in which traffic with duplicate AA is shown in blue.

Current Aircraft Surveillance Applications Systems (ASAS) consist of an Airborne Surveillance and Separation Assurance Processor (ASSAP) and Cockpit Display of Traffic Information (CDTI) module 100, such as that shown in FIG. 1.

Currently, DO-317C Minimum Operational Performance Standards (MOPS) for Aircraft Surveillance Applications System, published by RTCA, Inc., provides an overview of baseline Airborne Surveillance and Separation Assurance Processing (ASSAP) behavior. Under this guidance, messages include time of applicability and are valid when received, since they are transmitted at the speed of light, resulting in travel time being negligible. All associated data, like position, velocity, and Flight ID is stored in a database for each track indexed by its Announced Address (AA). Once per second, an ASSAP functional block outputs available information for all valid tracks extrapolated to a common time. FIG. 1 illustrates a typical Cockpit Display of Traffic Information (CDTI) 100 for tracks received from the ASSAP functional block. If a track is provided with velocity and heading information, an icon indicating the direction along with a line indicating the estimated position 30 seconds into the future will be drawn to represent its orientation with respect to the ownship platform 105 (the reference number also being used as the AA for purposes of the present disclosure), which is always drawn at the center of the display ring. Above or below the track icons, the available altitude relative to ownship 105 will be displayed. If the Flight ID of the track is available, also referred to as the tail number, it will be displayed under the associated icon. The associated AA values for each track in FIG. 1 have been drawn to indicate which targets have a non-unique value. The AA data is not typically displayed on a CDTI 100. As an example, the track with an AA of 110 and a Flight ID of QTS333 is displayed in FIG. 1 with a heading of due West, a relative altitude 1100 ft below ownship 105, and an up arrow indicating it is currently ascending at a rate greater than 500 ft/min. Likewise, the track with an AA of 120 and a Flight ID of DAL001 is displayed in FIG. 1 with a heading of Southwest, a relative altitude 1000 ft above ownship 105, and a down arrow indicating it is currently descending at a rate greater than 500 ft/min. In this example, ownship has an AA of 105 and is displayed, as stated earlier, at the center of the target ring.

When two targets broadcast the same AA, data parameters from their respective squitters will be comingled and consequently report and track processing will be corrupted for the duplicate addresses. More specifically, when airborne ADS-B tracks identified as duplicate AA tracks are used for display, they are excluded from common time track extrapolation, since their reported horizontal velocities and track angles are considered invalid. These tracks may be processed without track estimation and displayed as non-directional symbols.

In FIG. 1, there are two targets displayed with the same AA code of 130. Since the ADS-B messages from these two targets cannot be distinguished without additional processing, such as that disclosed herein, all information other than position will be invalidated. Consequently, these two tracks are displayed without any Flight ID or heading and velocity information. Upon transitioning to a duplicate AA track, Version 0, the most basic of the three forms of messaging supported under RTCA DO-260 (other versions include 1 and 2, although a version 3 is currently in the process of being certified), is set and all data for that track is invalidated, except those fields from Surface/Airborne position message types.

Display Traffic Information File (DTIF), a serial bus standard protocol defined by Aeronautical Radio, Incorporated (ARINC) in ARINC 735, is the standard for sending out a large list of tracks that is commonly used in ASAS. DTIF, however, has no flag for duplicate tracks. Instead, DTIF will provide "invalid" indicators (Heading, Velocity, etc.) to signal a duplicate. This leaves only horizontal and vertical position information available (see blue symbols corresponding to traffic with duplicate AA of 130 in FIG. 1). The CDTI module 100 will need to accept these invalid tracks to display this partial information.

Figure 2:
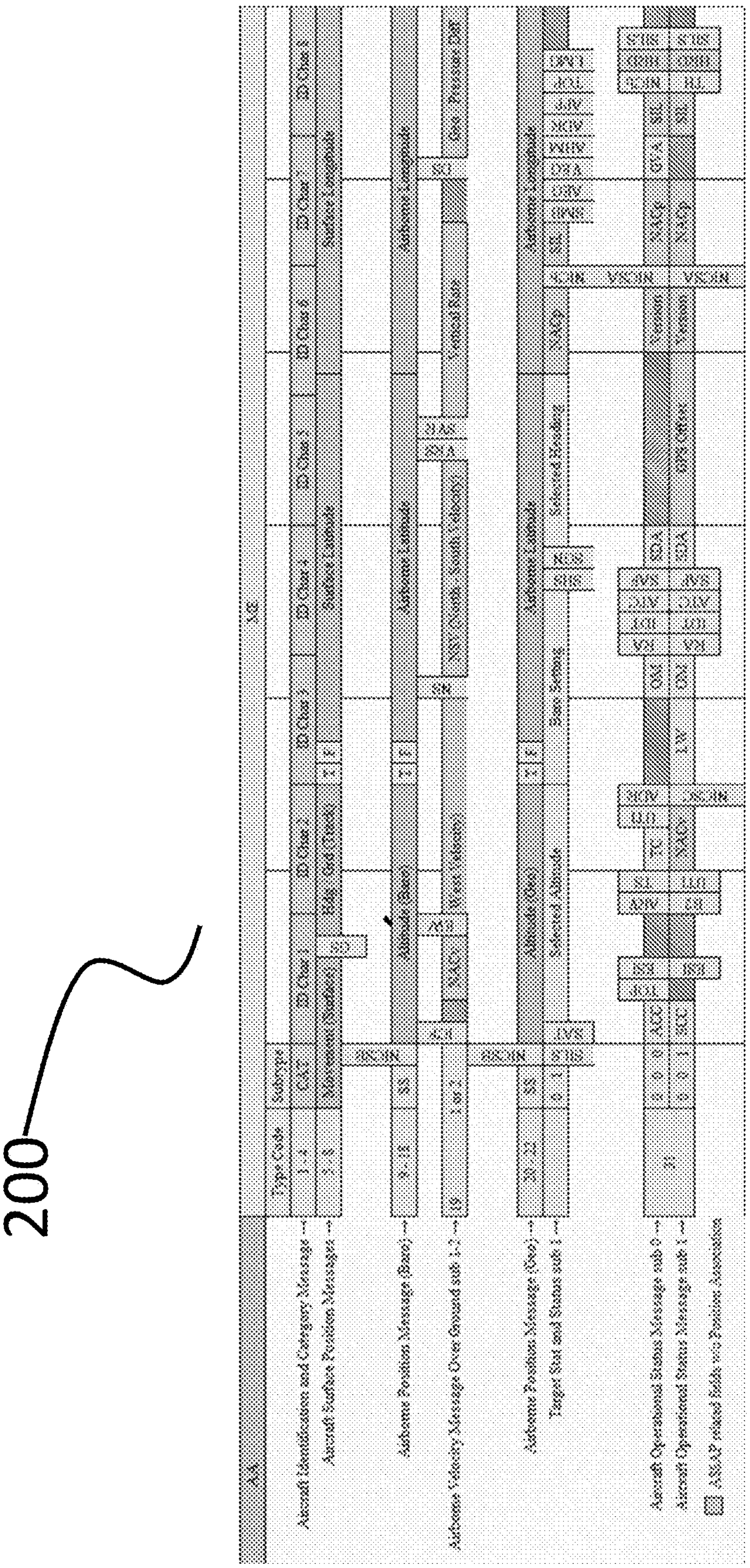
Figure 2 (Prior Art)
FIG. 2 is a chart showing current DO-260B ADS-B 1090ES (V2) Squitter Definitions.

The reason for this limitation is apparent from a review of DO-260B ADS-B 1090ES (V2) Squitter Definitions 200, which are provided in FIG. 2. More specifically, FIG. 2 shows that only position type messages contain both AA and position for correlation purposes. Said another way, there is no way of corroborating most messages because the data fields in the message do not include both AA and position. Notably, all message types, other than position type messages, cannot be discriminated by position using current techniques.

Notwithstanding the foregoing, there are, however, partial mitigations currently in place. These partial mitigations include falling back to Traffic Information Service-broadcast (TIS-B) information, this being an aviation information service that allows pilots to see aircraft that are not emitting ADS-B data, but have a basic transponder. More specifically, it is a service provided by ground stations looking at multiple targets in space that provides messages indicating what it sees from its plane. Typically, only very limited information is provided, relative to ADS-B.

If a TIS-B track is correlated with a Duplicate AA track, the TIS-B track can be selected as the best source for display. This can only occur, however, for the original track that transitioned to a duplicate track, not for the second ADS-B AA detected that resulted in the duplicate AA.

The present disclosure describes enhanced processing, beyond DO 317 prescribed default processing and partial mitigations applied thereto, that discriminates between two or more aircraft with same AA code. The disclosure addresses the problem from a few different approaches or discriminators.

More specifically, embodiments of the present disclosure utilize discriminators, such as: received power levels; diversity between receiving antennas or channels; temporal/DO-260 patterns; and parameter heuristics for slow varying parameters (i.e. parameters that are not expected to change or to change often), such as flight ID; version ID, Aircraft category/Set (e.g. glider, tanker, rotary aircraft, etc.), GPS offset, and established track fields available before duplicate AA traffic introduces potentially conflicting values. This list is intended to be exemplary and non-limiting, as one of ordinary skill in the art would be aware of additional parameters that could be used for discrimination.

In embodiments, each discriminator has a weighted value and, when integrated together, provides a confidence level for assigning tracks to specific traffic.

Figure 3:
FIG. 3 is an illustration showing a Cockpit Display of Traffic Information (CDTI) in which the duplicate AA traffic of FIG. 1, which was shown in blue, has been resolved through discrimination and is presented with full symbology, in accordance with embodiments of the present disclosure.

Doppler offset is also used, in embodiments, to qualify either duplicate or spoofed tracks. This offset can be estimated from the baseband waveform samples over the duration of a pulse train. For instance, if it is known that a track is moving away from or towards a reference location, its Doppler offset can be noted and should not change significantly unless an analogous change to the relative velocity is also observed. If a spoofing source starts generating a track that is advertising position and velocity changes relative to the reference location, without the expected Doppler changes, this would indicate possible spoofing.

Where discrimination is successful, i.e. where all parameters for both tracks are recovered/differentiated, the CDTI 300 of embodiments will display full symbology for the duplicate AA traffic, as shown in FIG. 3. FIG. 3 illustrates the results of fully discriminating duplicate target fields enabling the CDTI 300 to display the tracks having a common AA of 130 with their associated headings, vertical status (ascending for one and descending for the other), and Flight IDs of DB456 and DA123, respectively.

If discrimination is only partially successful, limited symbology corresponding to those parameters of the duplicate AA traffic that could be recovered/differentiated is still presented on the CDTI 300, in embodiments.

In embodiments, a non-CDTI Display of Traffic Information (e.g. a Display of Traffic Information (DTI) used by air traffic control) may be used to display information, whether or not the result of discrimination.

Embodiments of the present disclosure may be thought of as a rules-based expert system while other embodiments utilize Artificial Intelligence (AI) neural nets for discrimination and differentiation.

Figure 4:
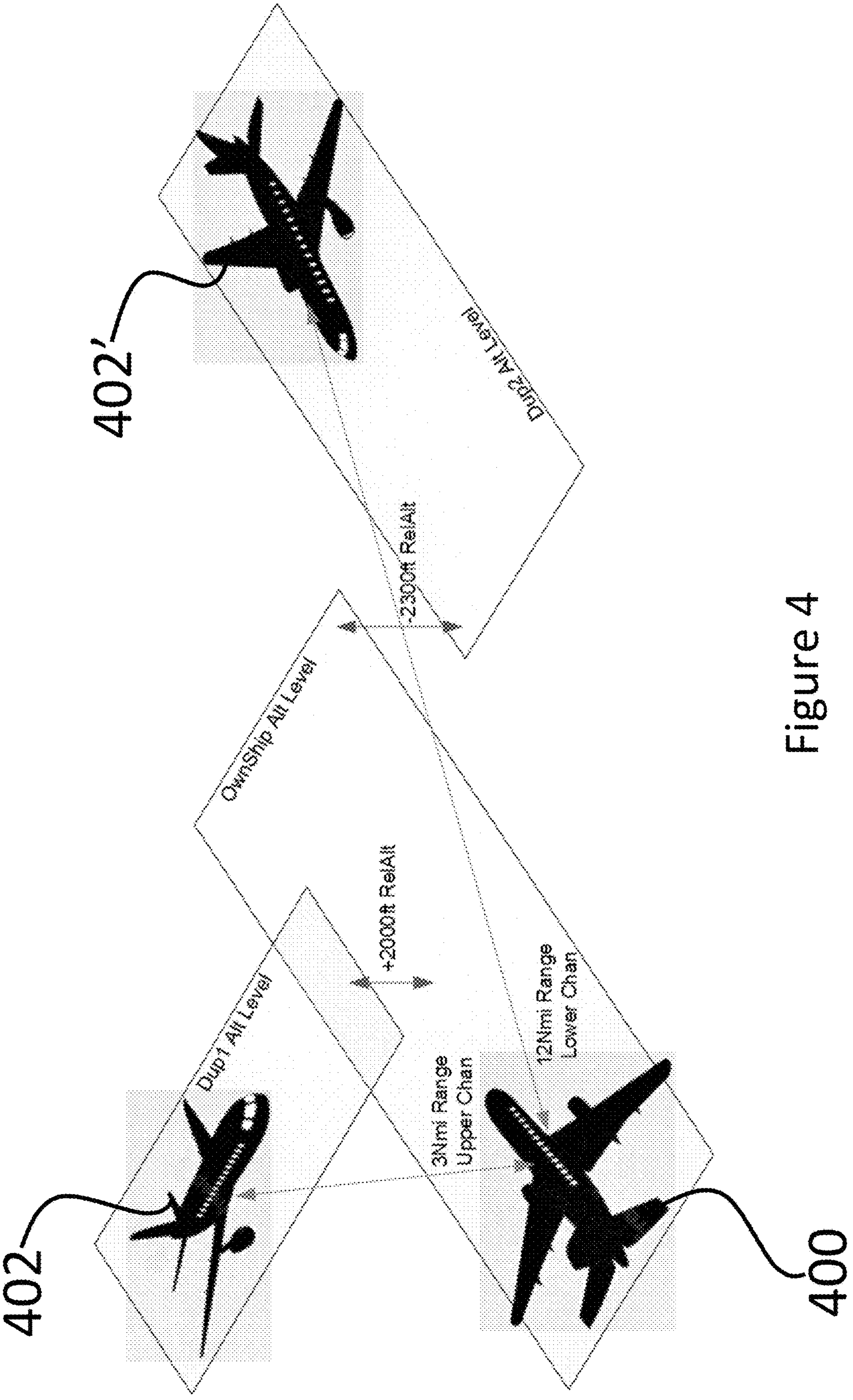
FIG. 4 is a schematic used to discuss correlation of duplicate AA using diversity discrimination, in accordance with embodiments of the present disclosure.

Before discussing FIG. 4, which illustrates a scenario with two aircraft at different distances from the ownship (AA of 400) transmitting messages with the same AA of 402 (reference no. 402' is used to distinguish between them), some background will be helpful. More specifically, ADS-B receiving systems possess two omnidirectional antennae with one channel on the top side of the aircraft and the other on the bottom in accordance with RTCA DO-260B. The ADS-B receiver can determine which channel (upper/lower) is receiving a message with higher power. The channel with the higher power will be used for demodulation and decoding. This process is part of the diversity functionality, as defined in RTCA DO-260B. The receiver channels also determine absolute power of the received signals. This diversity functionality can be used to discriminate between duplicate AA traffic, such as that depicted in FIG. 4, as described below.

More specifically, if two targets are broadcasting ADS-B with the same AA code and one is above the ownship 400 with the other below, channel diversity can be used to discriminate which message came from a particular target in space. For instance, if a message was received primarily (more strongly) on the upper channel (i.e. by the upper antenna), it can be associated with a known track with the declared AA if its relative altitude is positive with respect to ownship. When receiving broadcasts from a duplicate target primarily from the lower channel (i.e. from the lower antenna), it can only be associated with tracks having a relative altitude that is negative with respect to ownship. In embodiments, absolute received power diversity is used in conjunction with channel diversity to confirm that messages with relatively higher power levels are coming from the duplicate track that is closer to ownship while messages with lower power levels can be associated to the duplicate track further from ownship 400. These proposed methods of processing duplicate track messages involving using receiving channel/antenna data to differentiate between targets above and below ownship 400 and/or relative received power level data to differentiate between close and distant targets are referred to herein collectively as Diversity Discrimination.

Referring specifically to FIG. 4, which shows one duplicate AA target 402 above the ownship 400 while the other 402' is below the ownship 400, using the techniques described above, ownship 400 is able to discriminate between the duplicate AA traffic 402, 402' by determining if a message was received primarily (more strongly) on the upper or lower channel. For additional assurance that the determination is correct, relative received power levels can be correlated to target ranges. For instance, if a message from a target that is thought to be very far away is much weaker than one that is thought to be close to ownship 400, this would tend to confirm that the initial discrimination was correct. In embodiments, coarse power levels, as are typically available from a front end receiver, are used for this determination.

Figure 5:
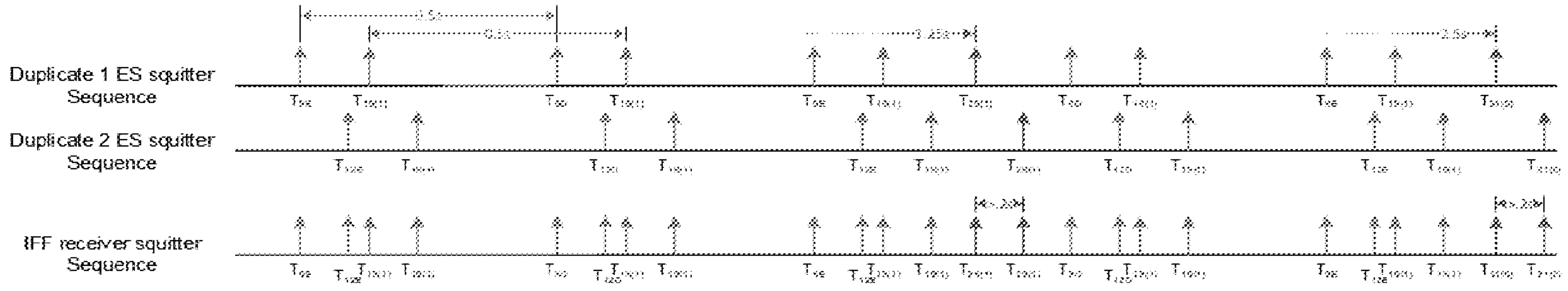
FIG. 5 is a chart and sequence diagram describing the squitter sequences of an established track and duplicate AA track showing how sequence analysis can be used to discriminate between duplicate AA traffic, in accordance with embodiments of the present disclosure.

Now referring to FIG. 5, enhanced processing of squitters for ASSAP applications, i.e. temporal DO-260 message patterns, involving pattern matching, which is also referred to herein as sequence analysis, is depicted using duplicate AA traffic Duplicate 1 and Duplicate 2. Regarding message patterns, it can be assumed that any transponder broadcasting ADS-B messages must comply with the periodicity as prescribed in RTCA DO-260b. In this example, established track (Duplicate 1) obeys DO-260 expected sequence rates for the various message formats broadcast, as illustrated in the table of FIG. 5, which is a reproduction of Table 2-79 in RTCA DO0260b. Once a message type has been received from Duplicate 1, additional messages of this type are not expected for this AA until the minimum time for this type of message, as prescribed in the table. If another message of the same type is received which would violate the rates of the illustrated table, it is suspected that the incongruent message is coming from another transponder.

Furthermore, if we assume that Duplicate 2 is also broadcasting at DO-260 required rates and random temporal offsets, this makes it nominally asynchronous with Duplicate 1. As Duplicate 2 has its own squitter sequence out of phase with respect with Duplicate 1 messages, what is decoded by the ownship ADS-B IN receiver is the interleaved sequence from both duplicate targets.

In this example scenario, it would be suspected that an incongruent message having an AA consistent with Duplicate 1 would be coming from Duplicate 2. In this way, two streams of intermingled messages can be associated with the most likely duplicate target.

More specifically regarding the pattern matching/sequence analysis example illustrated in FIG. 5, Duplicate 1 and Duplicate 2 comparison by sequence analysis can be used to distinguish implausible timing. For example, Aircraft Operational Status sequence $\tau$>2.6 s or between 0.9 s & 2.4 s or <0.7 s; Target State & Status sequence $\tau$>1.3 s or <1.2 s; and Aircraft Identification and Category $\tau$>5.2 s or <4.8 s, where $\tau$ is the period of successive messages of the same type. When analyzing the temporal sequence of squitter messages received, a proper association can be determined by pairing messages such that they comply with the expected DO-260 periodicity. Those squitters that do not fit a compliant message period or pattern can be assumed to belong to a separate, concurrent source. In this way, two separate streams of messages can be discriminated and associated with one or another duplicate target.

In embodiments, slow varying parameter heuristics, as described below, are used for enhanced processing of duplicate AA traffic 402, 402'. More specifically, several parameters transmitted by ADS-B systems are invariant or slow varying, for instance Version Number should never change; Aircraft Category/Set should never change; GPS Offset Should never change; and Aircraft ID should vary only infrequently. Since, for duplicate AA conditions, there is first an established track, any message from the associated AA with such invariant fields that are different than what is currently in the database has a high likelihood of having been sent by another duplicate track. In embodiments, such as the multi-mode processing embodiment described below, this is used as a factor in associating a duplicate AA with a particular aircraft.

In embodiments, discrimination due to these parameter changes can be used to reinforce discrimination via other additional duplicate target processing, as taught herein, such as power level processing (see FIG. 4 and accompanying description), diversity processing (see FIG. 4 and accompanying description), and squitter/extended squitter sequence processing (see FIG. 5 and accompanying description), among others, as would be apparent to one of ordinary skill in the art.

In embodiments, Multiple Mode Processing is used to enhance confidence in duplicate track processing and/or allow tracks to be discriminated where a single method of discrimination would be insufficient to do so. For instance, each method of discrimination, e.g. slow varying heuristics, diversity discrimination, and message sequence analysis, have different confidence levels associated with their successful application. In embodiments, these confidence levels are used to establish a weighted score, relative to the discrimination method, which is then used to assign a relative confidence level to the result of the analysis.

Figure 6:
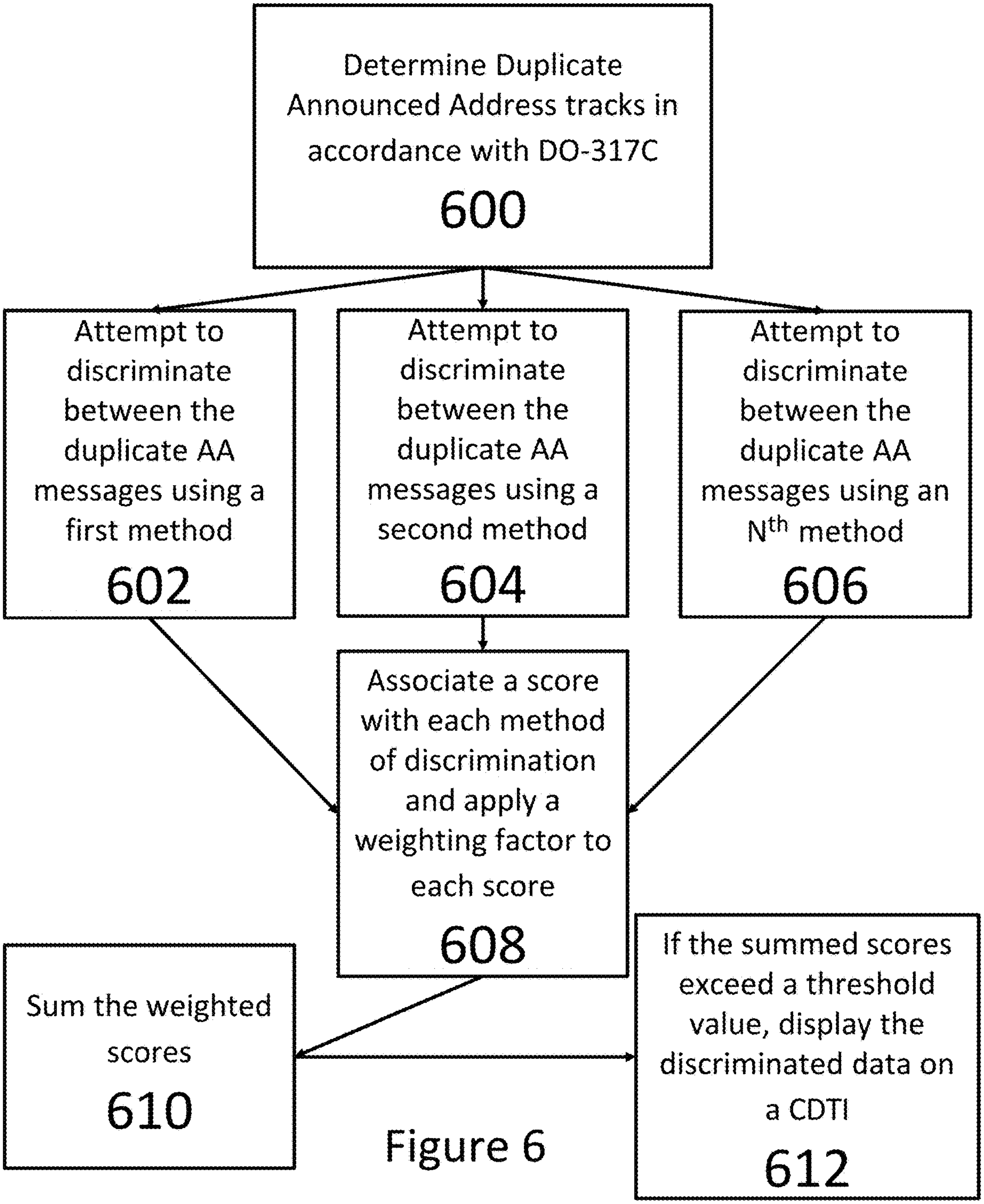
FIG. 6 is a flowchart describing a method of duplicate track processing that is herein referred to as multiple mode processing, in accordance with embodiments of the present disclosure.

In embodiments, multiple mode processing, as described in FIG. 6, comprises: determining duplicate AA tracks 402, 402' in accordance with DO-317C 600; attempting to discriminate between the duplicate AA traffic 402, 402' using a first discrimination method 602 (such as Diversity Discrimination, as described herein), a second discrimination method 604 (such as message sequence analysis, as described herein), and an $N^{th}$ discrimination method 606 (such as sequence analysis, as described herein or slow varying parameter heuristics, as described herein), where N is an integer and signifies the number of duplicate target 402, 402' discrimination techniques; generating a scoring system configured to associate a score with each method of discrimination used to discriminate between the duplicate AA traffic 402, 402' and applying a weighting factor to each score 608; summing the weighted scores from the different types of duplicate processing 610, and, when the overall score, which comprises the summed scores, is above a threshold value, associating the discriminated data fields with a particular aircraft (i.e. they are successfully discriminated and discriminated information is displayed on the CDTI 300) 612.

Conceptually, when messages are received by a receiver 700, they have different qualities and attributes (e.g. diversity, slow varying parameters (e.g. version number, flight ID, etc.), pattern or sequence matching, Doppler, etc.). The attributes of the received Duplicate Target message are supplied to processors 702, which utilize them to discriminate the message between the duplicate tracks with the associated methods 602, 604, 606 and, for each successful discrimination, a confidence score is accumulated. In embodiments, once all scoring is completed, an executive process determines if the confidence for the data contained in the message reaches the associated threshold. For data with sufficient confidence, the processor associates it with the appropriate duplicate track and the updated values are transmitted to the CDTI 300 for display.

In embodiments, successful discrimination results in the duplicate AA traffic 402 being shown in the CDTI 300 with full symbology. In embodiments, a lower score results in duplicate AA traffic 402 being shown in the CDTI 300 with less than full symbology (i.e. partially discriminated like Flight ID and no heading).

In embodiments, discrimination is performed on a message-by-message basis, allowing some information to be shown and other information suppressed. More specifically, if a duplicate target situation exists for a particular AA, when a message with that AA is received, it will be analyzed in accordance with embodiments of the present disclosure to discriminate to which duplicate target it is associated. If a message is successfully discriminated, the data it contains can be associated with the appropriate track. Otherwise, it will be invalidated. In embodiments, this process is performed for every message received with a duplicate AA.

In embodiments, different data fields require higher thresholds to be considered successfully discriminated. Examples of such data fields, which are herein referred to as high-tolerance data fields, include: Version Number (allows decoding of messages correctly and should never change—an incorrect version number will prevent proper decoding), Velocity, and $N_{acv}$ (a figure of merit for quality of velocity information; typically GPS-derived. Figure of merit provides error bounds on velocity information and is typically an indication of how many satellites the velocity is derived from).

In embodiments, various data fields require lower thresholds to be considered fully discriminated. Examples of such data fields, which are herein referred to as low tolerance data fields, include: aircraft ID and category.

In embodiments, only data fields that exceed required thresholds, after weighting and combining, are validated, in addition to position.

Notably, if velocity data is not valid, the corresponding DTIF track will still not have track angle.

Figure 7:
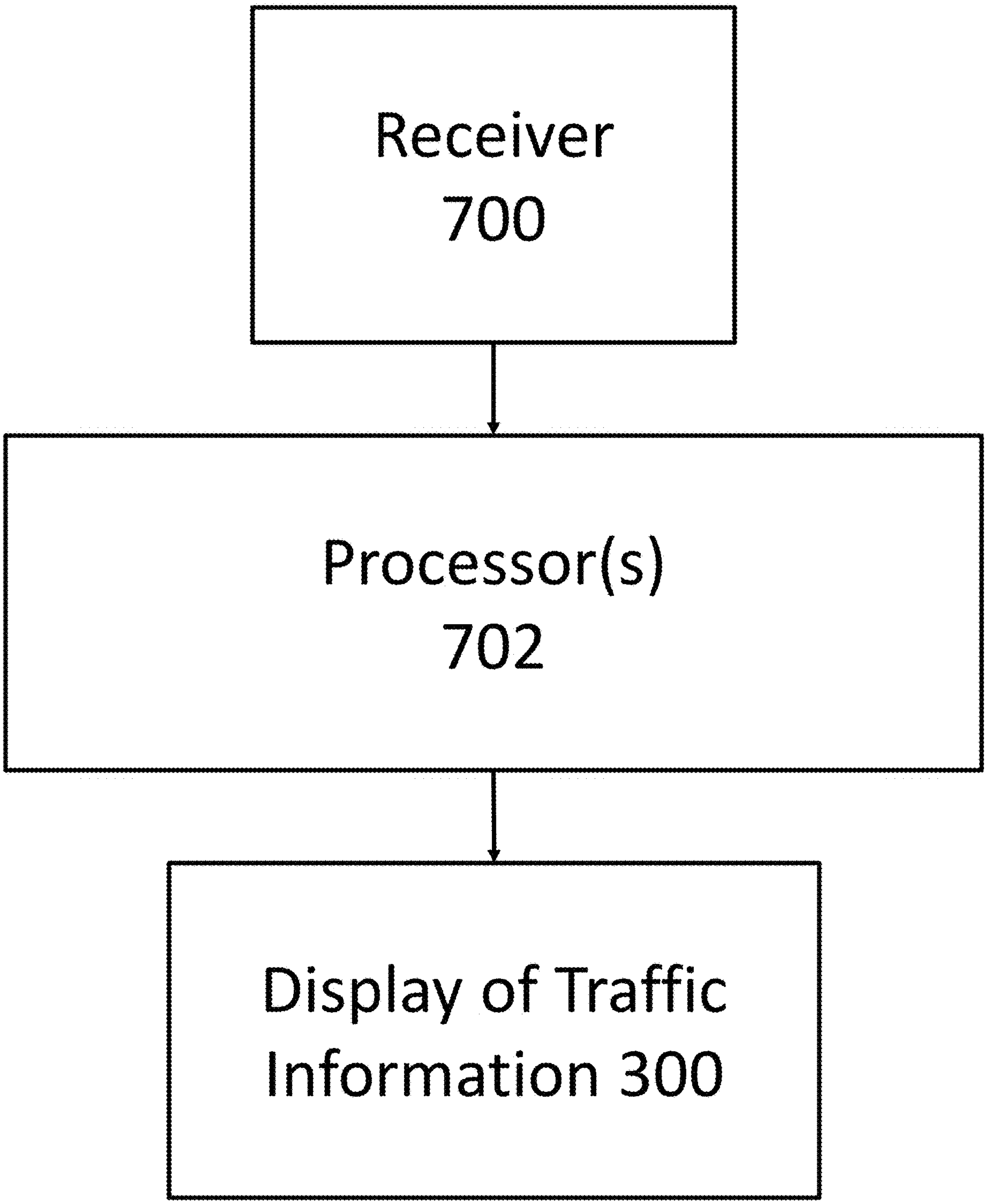
FIG. 7 is a schematic providing a high-level architecture for a duplicate AA discrimination system, in accordance with embodiments of the present disclosure.

Now referring to FIG. 7, a schematic providing a high-level architecture for a duplicate AA discrimination system, in accordance with embodiments of the present disclosure, is provided. Such a system includes a receiver 700 configured to receive ADS-B messages in operative communication with a processor 702 or processors 702 configured to discriminate between duplicate AA traffic 402 using the methods described herein, the processor(s) 702 being in further operative communication with a CDTI 300 configured to display successfully discriminated data (i.e. data associated with a particular aircraft, despite that aircraft having a duplicate AA).

In embodiments, each processor used in this system may include various modifications. More specifically, in embodiments, CPU #1 includes any or all of the following modifications: diversity included in report data; power level included in report data; squitter sequence functionality with plausibility rating provided to CPU #1 for each AA index; output more report data with reports; diversity values per squitter type; power level per squitter type; and squitter sequence plausibility per squitter type. Additionally, if anti-spoofing techniques are not implemented, embodiments only require additional data for targets with candidate or duplicate flag set.

Additionally, in embodiments CPU #2 includes any or all of the following modifications: modifications: duplicate report discriminator; uses additional data from CPU #1; evaluates slowly varying parameters; creates confidence scoring and threshold; and validates data fields according to score criteria. Additionally, if anti-spoof processing is implemented for all reports, embodiments of CPU #2 further comprise: power/diversity analysis; rules-based processing; and/or develop track ensemble database for kinematic validation.

The teachings of the present disclosure are applicable to military, civilian, and commercial aircraft avionics and ASA and anti-spoof ADS-B applications. Also, while predominantly discussed herein in the context of IFF/ATC transponders, the teachings of the present disclosure would be applicable to any avionics hosting ASA applications.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A method of enhanced processing used to discriminate between Automatic Dependent Surveillance Broadcast (“ADS-B”) messages with a duplicate announced address, the method comprising:

receiving ADS-B messages on a receiver, wherein the ADS-B messages are from at least two targets and comprise information for display by a display of traffic information;

identifying, from among the received ADS-B messages, ADS-B messages having a duplicate announced address as associated with one of the at least two targets using at least a first discriminator, a second discriminator, and an $N^{th}$ discriminator, where N is an integer;

determining a score for each discriminator by applying a weighting factor to the each discriminator, summing the scores of each discriminator, and comparing the score to a predetermined threshold;

designating the ADS-B messages that were subject to each discriminator as being discriminated messages as associated with one of the at least two targets based on the score exceeding the predetermined threshold; and displaying information provided by the discriminated messages on a display of traffic information as if the discriminated messages had been initially associated with only one of the at least two targets.

2. The method of claim 1, wherein the at least one discriminator comprises comparing received power levels between ADS-B messages and correlating relative received power levels to target ranges.

3. The method of claim 2, wherein the received power levels are obtained from a front end of a receiver.

4. The method of claim 1, wherein the at least one discriminator comprises a diversity discrimination metric.

5. The method of claim 4, wherein the receiver is in operative communication with at least two spaced apart antennas, each of which is spaced apart from the other, and wherein diversity discrimination comprises a comparison of signal strength received at the two antennas to information contained in the ADS-B message(s) to determine a likelihood that a target is the source of the message.

6. The method of claim 1, wherein the at least one discriminator is a sequence analysis.

7. The method of claim 6, wherein the sequence analysis comprises pairing messages such that they comply with an expected periodicity, with paired messages that do not fit a compliant message period or pattern being assumed to belong to a separate, but concurrent, source.

8. The method of claim 1, wherein the at least one discriminator is parameter heuristics for slow varying parameters.

9. The method of claim 8, wherein the parameter heuristics for slow varying parameters comprises treating any change to slow varying data received for an announced address currently being tracked as increasing a likelihood that an announced address is a duplicate announced address.

10. The method of claim 1, wherein the at least one discriminator comprises the comparison of established track fields to historical messages having a duplicate Announced Address.

11. The method of claim 1 wherein the at least one discriminator is a Doppler offset.

12. The method of claim 11, wherein the Doppler offset is estimated from baseband waveform samples over a duration of a pulse train corresponding to the ADS-B message.

13. The method of claim 11, wherein the Doppler offset of a target moving away from or towards a reference location is used as a discriminator; and wherein significant changes to the Doppler offset without an analogous change to relative velocity is indicative of duplicate announced address traffic.

14. The method of claim 11 wherein the Doppler offset is used to detect spoofing by associating a target generating a track that is advertising position and velocity changes relative to a reference location, without expected Doppler changes, with spoofing.

15. The method of claim 1, wherein the display of traffic information is configured to display full symbology for the targets sharing the same announced address if all parameters could be differentiated or to display limited symbology corresponding to those parameters of the targets sharing the same announced address that could be differentiated.

16. The method of claim 1, wherein identifying the ADS-B messages having the duplicate announced address with one of the at least two targets comprises the use of artificial intelligence, a rules-based expert system, frequency profiling, Fourier analysis, fingerprinting, or pattern matching.

17. A method of enhanced processing to discriminate between Automatic Dependent Surveillance Broadcast ("ADS-B") messages, the method comprising:

receiving ADS-B messages on a receiver, wherein messages from at least two targets share the same announced address;

attempting to associate messages having the same announced address with one of the at least two targets using at least a first method of discrimination, a second method of discrimination, and an $N^{th}$ method of discrimination, where Nis an integer;

generating a scoring system for each method of discrimination;

applying a weighting factor to each method of discrimination;

summing the weighted scores; and when the summed, weighted scores exceed a threshold value, associating the messages with a particular target and displaying data conveyed by the ADS-B messages now associated with the particular target on a display of traffic information.

18. The method of claim 17, further comprising associating at least one message associated with a low-tolerance data field with a particular target and displaying information conveyed by the ADS-B messages now associated with the particular target on a cockpit display of traffic information when the summed, weighted scores fail to exceed the threshold value.

19. The method of claim 17, wherein attempting to associate messages having the same announced address with one of the at least two targets is performed on a message-by-message basis.

20. A computer program product including one or more non-transitory machine-readable mediums encoded with instructions that when executed by one or more processors cause a process to be carried out for enhanced processing to discriminate between Automatic Dependent Surveillance Broadcast ("ADS-B") messages, the process comprising:

receiving ADS-B messages on a receiver, wherein messages from at least two targets share an announced address;

attempting to associate messages having the same announced address with one of the at least two targets using at least a first method of discrimination, a second method of discrimination, and an $N^{th}$ method of discrimination, where N is an integer;

assigning a score to a result of each method of discrimination;

applying a weighting factor to each method of discrimination;

summing the weighted scores; and where the summed, weighted score exceeds a predetermined threshold value, considering the ADS-B messages that were subject to each method of discrimination as being discriminated messages associated with a single target; and displaying data provided by the discriminated messages on a display of traffic information module as if they had been initially associated with only one of the at least two targets.

* * * * *